July 25, 1967  R. D. GRABOW  3,333,125
DIRECTIONAL DRIVE CONTROL FOR SYNCHRONOUS REACTION MOTOR
Filed April 8, 1965
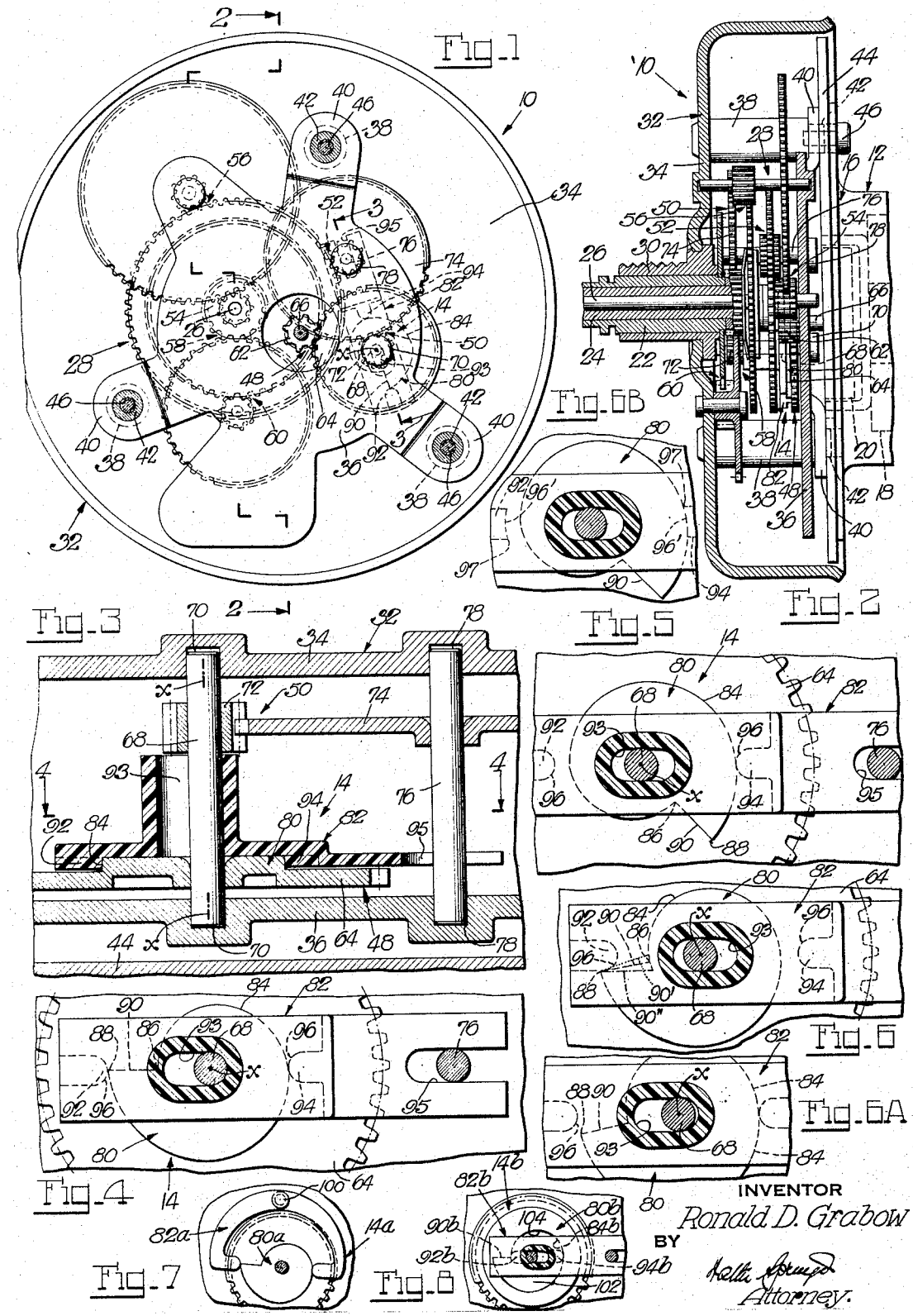
INVENTOR
Ronald D. Grabow
BY
Attorney.

United States Patent Office 3,333,125
Patented July 25, 1967

3,333,125
DIRECTIONAL DRIVE CONTROL FOR
SYNCHRONOUS REACTION MOTOR
Ronald D. Grabow, Delavan, Wis., assignor to Amphenol
Corporation, a corporation of Delaware
Filed Apr. 8, 1965, Ser. No. 446,505
20 Claims. (Cl. 310—41)

This invention relates to self-starting synchronous reaction motors in general, and to directional drive controls for such motors in particular.

Motors of this kind have a multi-polar field of which alternate poles are of opposite polarity at any given instant and change their polarity in phase with alternating current applied to an associated field coil, and a permanent-magnet rotor the pole faces of which cooperate with the field poles in stepping the rotor in synchronism with the alternation of the applied current. These motors will generally self-start when on the initial polarization or polarizations of the field poles the rotor becomes unstable in any idle position and soon takes off in either direction. Since for most applications the motors are required to run in a predetermined direction, they are provided with a directional drive control which permits the rotor to start in either direction and causes the same to reverse into the right direction whenever the same starts in the wrong direction. Most of the known directional drive controls are of spring type or of positive cam type.

The present invention is concerned with a positive cam-type drive control as the more suitable to attain with a very simple and low-cost construction such objectives as maximum freedom of the rotor to develop starting torque as well as sustained running torque to the fullest, and long-time reliable and noiseless performance of the control under any and all operating conditions. The known controls of positive cam type have a rotor-driven part with a cam edge and shoulders, and another part with spaced followers, with the cam edge of the driven part being on the normal rotor drive in engagement with the followers to cam them into and out of alignment, respectively, with the shoulders at such alternation that they clear the latter on each pass, but being on a wrong-directional rotor start out of engagement with the followers so that one of the shoulders will clash with the nearest follower aligned therewith with ensuing reversal of the rotor into correct drive direction. However, these known cam-type controls fall considerably short of attaining the aforementioned objectives owing to their rapid and abrupt cam-follower actions which produce considerable inertial forces that are bound to impede to some extent the rotor's freedom of response to the excited field. Moreover, the all too rapid and abrupt cam-follower actions of these controls bring about occasional malfunctioning, jamming and even destruction of the controls.

It is an object of the present invention to provide for a self-starting synchronous motor a directional drive control of positive cam type which attains the aforementioned objectives of affording maximum freedom to the rotor to develop to the fullest its potential starting torque as well as running torque, and long-time reliable and noiseless performance of the control under any and all operating conditions.

It is another object of the present invention to provide for a self-starting synchronous motor a directional drive control of positive cam type which has its cam action so arranged that the inertial forces thereof are so negligible as to have to all practical intents and purposes no impeding effect on the rotor's freedom of response to the excited field. This is achieved by forming the rotor-driven part as an edge cam with the pitchline thereof extending generally spirally between the low and high cam points over substantially 360 degrees, and for the remainder extending substantially straight between the high and low points to serve as a shoulder for rebound from the associated follower part on a wrong-directional rotor start. In thus arranging the cam action, the follower part is during normal running of the motor moved back and forth only once for each complete revolution of the cam part, and the follower part is thus moved in either direction by wedge-like action of exceedingly small wedge angle of the cam part, with the result that operational displacement of the follower part is only a small fraction of the peripheral displacement of the cam part per time unit, wherefore the inertial forces produced are exceedingly small. Further, rotor torque of only minute magnitude is required to operate the directional control during a correct-direction self-start and during normal running of the rotor. Moreover, the cam action of the directional control, while taking place during normal motor running for at least the greater part of each revolution of the cam part, is suspended altogether on a wrong-directional rotor start until rebound action of the control occurs, wherefore the control affords also maximum freedom to the rotor to self-start, and proceed more often than not for a considerable distance, in the wrong direction if it has the overpowering urgency in that direction, and will then by particularly forceful rebound action assuredly reverse the rotor into the correct drive direction.

Another object of the present invention is to provide for a self-starting synchronous motor a directional drive control with the cam part arranged as just mentioned above, in which the follower part is further arranged so that the follower elements thereof are diametrically opposite each other with respect to the axis of the cam part, and they are in substantial engagement with the cam edge when either follower is adjacent the high cam point, whereby the follower part is during normal motor running moved once to and fro for the full duration of each revolution of the cam part. With this arrangement, the single to-and-fro motion of the follower part for each revolution of the cam part is of the ultimate in duration and under full cam control at any instant, with the result that the motion of the follower part is of optimum smoothness even at reversals and the inertial forces are at an absolute minimum which further makes for clashless and, hence, noiseless performance of the control in normal motor running as well as for its reliable performance for the longest time.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a section through an exemplary movement with a synchronous motor drive embodying the present invention;

FIG. 2 is a section through the same movement taken substantially on the line 2—2 of FIG. 1;

FIG. 3 is an enlarged fragmentary section through the featured synchronous motor drive of the movement, taken substantially on the line 3—3 of FIG. 1;

FIG. 4 is a fragmentary section through the synchronous motor drive of the movement, with the section taken substantially on the line 4—4 of FIG. 3;

FIG. 5 is a fragmentary section similar to FIG. 4, but showing the synchronous motor drive in a different operating position;

FIG. 6 is another fragmentary section similar to FIGS. 4 and 5, but showing the synchronous motor drive in still another operating position;

FIG. 6A is still another fragmentary section similar to FIGS. 4 to 6, and showing the synchronous motor drive in a further operating position;

FIG. 6B is a fragmentary section through a synchronous motor drive embodying the present invention in a modified manner;

FIG. 7 is a fragmentary section through a synchronous motor drive embodying the present invention in a further modified manner; and FIG. 8 is a fragmentary section through a synchronous motor drive embodying the present invention in another modified manner.

Referring to the drawings, and more particularly to FIGS. 1 to 2 thereof, the reference numeral 10 designates an exemplary movement of a timing device, in this instance a clock, which has a synchronous motor 12 for its prime mover and a directional motor drive control 14 that embodies the present invention. The motor 12 has the usual field structure 16 including a field coil 18, and a permanent-magnet rotor 20 which starts and runs in either direction on energization of the field coil 18 (FIG. 2). The exemplary movement 10 has hour, minute and second shafts 22, 24 and 26 which carry the usual hands (not shown), and a gear train 28 which connects the motor 12 with these shafts. The hour, minute and second shafts are nested in conventional manner and received in a mounting sleeve 30 on a cup-shaped gear case 32 the bottom 34 of which forms one of the endplates of the movement, with the opposite endplate 36 being held in spaced parallel relation therewith by pillars 38. In the present instance, the endplate 36 has apertured lugs 40 which are located on reduced ends 42 of the pillars 38. Also located on these reduced pillar ends 42 is the motor 12, in this instance with its outer field plate 44, with the motor 12 and adjacent endplate 36 being secured to the pillars 38 by screws 46.

The gear train 28 comprises in this instance successive speed-reduction stages 48, 50 and 52 which drivingly connect the rotor 20 with the second shaft 26, and further speed-reduction stages 54, 56 and 58, 60 which drivingly connect the second shaft 26 with the minute shaft 24 and the latter with the hour shaft 22, respectively, with the rotor 20 having the highest speed. The first speed-reduction stage 48 comprises a pinion 62 and therewith meshing gear 64 (FIGS. 1 and 2) of which the pinion 62 is fast on the shaft 66 of the rotor 20 and gear 64 is fast on a staff 68 which is journalled with its ends in bearings 70 provided in the opposite endplates 34 and 36 (FIG. 3). The next speed-reduction stage 50 comprises a pinion 72 and therewith meshing gear 74, of which the pinion 72 is fast on the staff 68 and, hence, turns in unison with gear 64 about the axis of staff 68, while gear 74 is fast on a staff 76 which is journalled with its ends in bearings 78 provided in the opposite endplates 34 and 36 (FIG. 3). The gearing of the remaining speed-reduction stages 52 to 60 is conventional and readily understood from FIGS. 1 and 2, wherefore no further description thereof is required.

The directional motor drive control 14 comprises, in the present example, a rotor-driven cam part 80 and a follower part 82 of which the cam part 80 is driven by the rotor 20, in this instance through intermediation of the first speed-reduction stage 48 of the gear train 28. To this end, the cam part 80 turns in unison with the gear 64 about the rotary axis x thereof by being mounted on the rotary staff 68. The cam part 80 may advantageously be formed integrally with the gear 64 as shown (FIG. 3). The part 80 is an edge-type cam, being in this instance of disc-like formation with its outer peripheral edge forming the cam edge 84 (FIGS. 1 and 4). The cam edge 84 extends generally spirally about the axis x substantially over 360 degrees and the low and high points 86 and 88 thereof are connected by a substantially straight edge 90 which serves as a shoulder. The follower part 82, which in this instance is in the form of a slide on the cam part 80, has spaced follower formations 92 and 94 that cooperate with the cam part 80 on opposite sides of the axis x. The follower part 82, which may advantageously be of Delrin or some other suitable plastic, is guided for cam-following motion in a preferred rectilinear path. This is achieved conveniently and advantageously by providing the follower part 82 with spaced slots 93 and 95 through which the respective staffs 68 and 76 extend (FIGS. 3 and 4), with the follower part being held against axial movement on these staffs by being interposed between the cam part 80 and pinion 72 on the staff 68.

In operation of the exemplary clock 10, i.e., on the drive of the rotor 20 in the correct direction, the cam part 80 will be driven in counterclockwise direction as viewed in FIGS. 1, 4 and 5, with the result that the cam edge 84 of the driven part 80 will engage the follower formations 92 and 94 of part 82 and move them into and from alignment with the shoulder 90 at such alternation that they clear the latter on each pass. Thus, in the momentary position of the cam part 80 in FIG. 5 on its normal counterclockwise drive the cam edge 84 engages and cooperates with the follower formation 94 in moving the latter out of alignment with the shoulder 90 and simultaneously moving the other follower formation 92 into alignment with the shoulder 90, with the follower part 82 being thus moved to the right as viewed in FIG. 5 until the high point 88 of the cam edge 84 and, hence, also the shoulder 90 pass the follower formation 94. On the then continued counterclockwise drive of the cam part 80 the cam edge 84 will engage and cooperate with the follower formation 92 in moving the same out of alignment with the shoulder 90 and simultaneously moving the other follower formation 94 into alignment with the shoulder 90, with the follower part 82 being thus moved to the left as viewed in FIG. 5 until the high point 88 of the cam edge 84 and, hence, also the shoulder 90 pass the follower formation 92 (FIG. 4). The follower part 82 is thus reciprocated once during each revolution of the cam part 80, with the follower formations 92 and 94 being cammed out of alignment with the shoulder 90 on each pass thereof for uninterrupted drive of the cam part 80 in normal counterclockwise direction.

Assuming now that on current interruption the exemplary clock stops, with the rotor 20 of the clock motor 12 assuming a repose position in which the cam part 80 assumes the exemplary repose position shown in FIG. 5. On current restoration, i.e., reenergization of the field coil 18, the rotor 20 will self-start in either direction, and let it be assumed that the same will in this instance self-start in the wrong direction in which the cam part 80 will be drawn clockwise from its repose position in FIG. 5. With the cam part 80 being thus driven clockwise from the exemplary repose position in FIG. 5 on a wrong-directional start of the rotor 20, the cam edge 84 will disengage from the follower formation 94, wherefore the follower part 82 will remain in the position shown in FIG. 5 in which the other follower formation 92 is in operative alignment with the shoulder 90. Accordingly, the shoulder 90 will shortly clash with the aligned follower formation 92 (FIG. 6) and rebound therefrom into normal counterclockwise direction, with the rebound action of the cam part 80 being through the speed-reduction stage 48 of the gear train 28 transmitted to the rotor 20 for its reversal into correct drive direction and resumption of the normal drive of the exemplary clock, as will be readily understood. Of course, the cam part 80 may on clock stoppage come to rest in any other position from that of FIG. 5, depending on whichever repose position the rotor 20 may assume. However, regardless of the repose position of the cam part 80, its shoulder 90 will on a wrong-directional start of the rotor 20 clash with and rebound from the nearest aligned follower formation 92 or 94, with the motion of the cam part in the wrong, clockwise direction until clash of its shoulder 90 with the nearest aligned follower formation 92 or 94 occurs being more usually anywhere between a few angular degrees and approximately 180 degrees. Thus, wrong-directional, clockwise, drive of the cam part 80 over a distance of approximately 180 degrees would occur if the same were thus driven from the exemplary repose position shown in FIG. 4, as will be readily understood. Of course, the cam part 80 will on a wrong-directional rotor start be driven beyond 180 degrees if its shoulder 90 will for any reason miss the nearest follower formation 92 or 94, in which case the cam part will with its shoulder 90 assuredly clash with and rebound from the next succeeding follower formation. This situation may arise, for example, in positions of the clock and follower part 82 in which the latter gravitates to either end of its reciprocatory range and in consequence shifts the follower formation 92 or 94 nearest the approaching cam shoulder 90 out of alignment with the latter, as will be readily understood.

More often than not, wrong-directional drive of the cam part 80 until clash of its shoulder with the nearest aligned follower formation occurs is considerably more than a few degrees. This, coupled with the fact that the rotor 20 is drivingly connected with the cam part 80 through the speed-reduction stage 48 of the gear train 28, mostly affords the rotor more than ample opportunity to reach on a wrong-directional self-start its full running torque before the same is reversed into correct drive direction by the described rebound action of the drive control 14, wherefore the rebound action is sufficiently powerful assuredly to reverse the rotor and bring it quickly into synchronized stepping with the alternation of the applied current for development of its full running torque and assured continued running under its full load. However, the drive control 14 will act in assuredly reversing the rotor 20 on a wrong-directional start under any and all circumstances, including a rare repose position of the cam part 80 from which the same could be driven in the wrong, clockwise, direction only a few degrees before reaching the nearest aligned follower formation 92 or 94 and as a result might conceivably become hung-up on the latter once in a very great while with ensuing stalling of the rotor and, hence, motor. To avoid any such hang-up of the cam part 80 on a follower formation under such or similar circumstances, the follower formations 92 and 94 are in this instance rounded at least over their end flanks 96 which confront the shoulder 90 of the cam part on wrong-directional, clockwise, drive of the same. Thus, let it be assumed that the cam part 80 would come to rest in a particularly unfavorable position for its reversal on a wrong-directional rotor start, such as the exemplary position of the cam part in FIG. 6A in which the shoulder 90 thereof is but a few degrees away from the follower formation 92. In these circumstances, the shoulder 90 on the cam part might, on a wrong-directional rotor start and following its very brief motion into engagement with the aligned follower formation 92, conceivably become hung-up on this follower formation if the acting end of the latter were squared-off, for example, whereas with this acting follower end being rounded at 96, hang-up of the cam part thereon would be virtually impossible because the high point 88 of the cam edge 84 would either clash with the rounded follower end 96 and rebound therefrom, or through the latter would cam the follower part 82 sufficiently to the left to clear the follower formation 92 and proceed to the other follower formation 94 with which the shoulder 90 would then certainly clash and rebound therefrom with ensuing reversal of the rotor into correct drive directions.

FIG. 6B shows an arrangement in which the acting ends 96′ of the followers 92 and 94 are preferably concave in contrast to the rounded, convex, ends 96 of the followers in FIGS. 4 to 6. The concavity of these follower ends 96′ is preferably such that on a wrong-directional rotor start the cam shoulder 90 will miss either follower end 96′ throughout its width as long as it misses the sharp corner 97 thereat. Accordingly, the cam edge 90 will on a wrong-directional rotor start either clear the nearest follower 92 or 94 in its entirety or assuredly clash with and rebound from the sharp corner 97 thereof, thus precluding any possible hang-up of the cam part 80 on either follower and, hence, stalling of the rotor.

As already mentioned, in normal running of the exemplary clock and, hence, its motor 12, the follower part 82 of the directional drive control 14 is reciprocated once during each revolution of the cam part 80 thereof, with the follower formations 92 and 94 being cammed out of alignment with the shoulder 90 on each pass thereof for uninterrupted drive of the cam part 80 in normal counterclockwise direction. For smoothest cam action of the drive control 14 in normal running of the motor 12, the follower formations 92 and 94 are preferably arranged diametrically opposite each other with respect to the axis $x$, and are preferably spaced from each other so that they are in substantial engagement with the cam edge 84 when either follower formation 92 or 94 is in substantial engagement with the high point 88 of the cam edge 84 (FIG. 4). With this arrangement, the cam action of the drive control 14 is continuous for the full duration of each revolution of the cam part 80, with the motion of the follower part 82 in each direction of its single reciprocatory cycle for each revolution of the cam part 80 being also of the same duration. Thus, on normal counterclockwise drive of the cam part 80 into and beyond the momentary position in FIG. 5, the cam edge 84 cooperates with the follower formation 94 in moving the latter and, hence, the follower part 82 to the right until the high point 88 of the cam edge reaches the follower formation 94 at which time the opposite follower formation 92 has been brought into substantial engagement with the part of the cam edge 84 which is diametrically opposite the high point 88 thereof. Accordingly, on the continued drive of the cam part 80, the cam edge 84 will then cooperate with the follower formation 92 in moving the latter and, hence, the follower part 82 to the left (FIG. 5) and until the high cam point 88 reaches the follower formation 92 (FIG. 4) at which time the follower formation 94 is again in substantial engagement with the cam edge 84 so that the latter will take over in again moving the follower part 88 to the right as the high cam point 88 clears the follower formation 92. The cam action of the drive control 14 during normal running of the motor 12 is thus continuous and each single reciprocatory cycle of the follower part 82 is of maximum duration, which makes for smooth and positively cam-controlled motion of the follower part at all times. Further, by arranging the cam edge 84 as a spiral and extending it over substantially 360 degrees, the follower part 82 is moved in either direction by wedge-like action of exceedingly small wedge angle of the cam part, with the result that operational displacement of the follower part is but a small fraction of the peripheral displacement of the cam part per time unit, which further enhances smoothness of operational motion of the follower part, and the ensuing inertial forces in the drive control are so negligible that they will not impede the rotor's freedom to sustain its running torque to the fullest. By the same token, the continuous operation and cam action of the drive control in normal running of the motor requires only minute rotor torque so that virtually the entire rotor torque is available to drive the load. Also, the instant drive control is of exceeding structural simplicity and lends itself to efficient mass production at very low cost, yet performs reliably for the longest time and without generating noise.

While in the described drive control 14 the spiral cam edge 84 of the cam part 80 extends over exactly 360 degrees so that the straight shoulder 90 extends truly radially with respect to the axis $x$ as shown in dash lines in FIG 6, it is, of course, fully within the ambit of the present invention to extend the spiral cam edge over somewhat less or more than 360 degrees and arrange the connecting shoulder like or similar to either of the dotted-line or dot-and-dash line shoulders 90′ and 90″, respectively (FIG. 6). Also, while in the described drive control 14, the follower part 82 is guided for rectilinear cam-following motion, it is obviously within the purview of the invention to arrange the follower part for oscillatory cam-following motion about a pivot axis. Thus, FIG. 7 shows a modified drive control 14a the follower part 82a of which is mounted on a fixed pivot 100 about which it is oscillated by the cam part 80a in normal operation of the motor. Further, while in the described drive control 14 the cam part 80 is the driven part, it is clearly within the purview of the present invention to arrange the cam part fixed in position and mount the follower part on the gear 64 for turning movement therewith and for guidance thereon for rectilinear or oscillatory cam-following motion.

Finally, FIG. 8 shows another modified drive control 14b of which the driven cam part 80b is a disc having a recess 102 the peripheral edge 104 of which is shaped to form the cam edge 84b and shoulder 90b, with the follower formations 92b and 94b of the follower part 82b being arranged as shown so as to be cammed into and from alignment with the shoulder 90b at such alternation as to clear the latter on each pass during normal drive of the cam part 80b in correct direction which in this case is clockwise direction, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a self-starting synchronous motor, the combination with a field structure including a field coil, and a permanent-magnet rotor starting and running in either direction on energization of said coil, of a directional drive control having a first rotor-driven part with a rotary axis and a second part, of which one part has about said axis a generally spiral cam edge with low and high points spaced substantially 360 degrees apart and a substantially straight edge connecting said points and serving as a shoulder, and the other part has two spaced cam followers on opposite sides of said axis and is guided for movement with its followers back-and-forth toward and away from said axis, with said parts being coordinated so that said cam edge will on the rotor drive in correct direction engage said followers and move them into and from alignment, respectively, with said shoulder at such alternation that they clear the latter on each pass, but will on the rotor drive in the wrong direction be disengaged from said followers so that said shoulder and the nearest follower aligned therewith will clash with ensuing reversal of the rotor into correct drive direction.

2. The combination in a self-starting synchronous motor as set forth in claim 1, in which said one part is said rotor-driven part.

3. The combination in a self-starting synchronous motor as set forth in claim 1, in which said one part is a disc with its outer peripheral edge forming said cam edge and shoulder.

4. The combination in a self-starting synchronous motor as set forth in claim 1, in which said followers are arranged substantially diametrically opposite each other with respect to said axis.

5. The combination in a self-starting synchronous motor as set forth in claim 1, in which said followers are arranged substantially diametrically opposite each other with respect to said axis and spaced apart to be in substantial engagement with said cam edge when either of said followers is adjacent said high point thereof.

6. The combination in a self-starting synchronous motor as set forth in claim 1, in which said one part is a disc with its outer peripheral edge forming said cam edge and shoulder, and said followers are arranged substantially diametrically opposite each other with respect to said axis and spaced apart to be in substantial engagement with said cam edge when either of said followers is adjacent said high point thereof.

7. The combination in a self-starting synchronous motor as set forth in claim 1, in which said one part is a disc having a recess the peripheral edge of which forms said cam edge and shoulder.

8. The combination in a self-starting synchronous motor as set forth in claim 1, in which said cam points are spaced exactly 360 degrees apart, and said connecting edge is rectilinear and extends radially of said axis.

9. The combination in a self-starting synchronous motor as set forth in claim 1, in which said other part is guided for cam-following motion in a rectilinear path normal to said axis.

10. The combination in a self-starting synchronous motor as set forth in claim 1, in which said other part is pivotally mounted for said back-and-forth motion of its followers.

11. The combination in a self-starting synchronous motor as set forth in claim 1, in which said other part is pivoted about an axis parallel to said rotary axis for said back-and-forth motion of its followers.

12. The combination in a self-starting synchronous motor as set forth in claim 1, in which said followers are longitudinal formations on said other part extending substantially radially of said axis, with the cam-edge engaging ends of said formations being convex.

13. The combination in a self-starting synchronous motor as set forth in claim 1, in which said followers are longitudinal formations on said other part extending substantially radially of said axis, with the cam-edge engaging ends of said formations being concave and terminating in sharp corners on opposite sides of said formations.

14. In a self-starting synchronous motor, the combination with a field structure including a field coil, a permanent-magnet rotor starting and running in either direction on energization of said coil, a load shaft, and a speed-reduction drive between said rotor and shaft including a first driven element with a rotary axis, with the rotor having the highest speed, of a directional drive control having a first part turning in unison with said element about said axis and a second part, of which one part has about said axis a generally spiral cam edge with low and high points spaced substantially 360 degrees apart and a substantially straight edge connecting said points and serving as a shoulder, and the other part has two spaced cam followers on opposite sides of said axis and is guided for movement with its followers back-and-forth toward and away from said axis, with said parts being coordinated so that said cam edge will on the rotor drive in correct direction engage said followers and move them into and from alignment, respectively, with said shoulder at such alternation that they clear the latter on each pass, but will on the rotor drive in the wrong direction be disengaged from said followers so that said shoulder and the nearest follower aligned therewith will clash with ensuing reversal of the rotor into correct drive direction.

15. The combination in a self-starting synchronous motor as set forth in claim 14, in which said reduction drive includes two spaced parallel staffs of which one staff is rotary about said axis and carries said element and said one part, and said other part has a slot formation through which said staffs extend, with said other part being held against movement axially of said staffs but being by the latter guided for movement with its followers back-and-forth in a rectilinear path normal to said axis.

16. The combination in a self-starting synchronous motor as set forth in claim 15, in which said reduction drive includes a second driven element carried by said first staff, with said one part being intermediate said first and second elements, and said other part being interposed between said one part and second element and held thereby against motion axially of said staffs.

17. The combination in a self-starting synchronous motor as set forth in claim 16, in which said first elemene is a gear, and said one part is formed integrally with said gear.

18. The combination in a self-starting synchronous motor as set forth in claim 16, in which said elements are gears and said one part is formed integrally with said first element.

19. In a self-starting synchronous motor, the combination with a field structure including a field coil, and a permanent-magnet rotor starting and running in either direction on energization of said coil, of a directional drive control having a first part rotary about an axis, a second part, a speed reduction drive between said rotor and first part with the rotor having the higher speed, one of said parts having about said axis a generally spiral cam edge with low and high points spaced substantially 360 degrees apart and a substantially straight edge connecting said points and serving as a shoulder, and the other part having two spaced cam followers on opposite sides of said axis and being guided for movement with its followers back-and-forth toward and away from said axis, with said parts being coordinated so that said cam edge will on the rotor drive in correct direction engage said followers and move them into and from alignment, respectively, with said shoulder at such alternation that they clear the latter on each pass, but will on the rotor drive in the wrong direction be disengaged from said followers so that said shoulder and the nearest follower aligned therewith will clash with ensuing reversal of the rotor into correct drive direction.

20. The combination in a self-starting synchronous motor as set forth in claim 19, in which said speed reduction drive includes a gear turnable about said axis, and said first part is said one part and formed integrally with said gear.

References Cited

UNITED STATES PATENTS 3,200,915   8/1965   Lundin _____ 310—41

FOREIGN PATENTS 550,809   1/1943   Great Britain.

MILTON O. HIRSHFIELD, *Primary Examiner.*

L. L. SMITH, *Assistant Examiner.*